United States Patent
Scharf et al.

(10) Patent No.: US 10,054,180 B2
(45) Date of Patent: Aug. 21, 2018

(54) AXIALLY DAMPING ELASTOMER BEARING, IN PARTICULAR FOR A MOTOR VEHICLE

(71) Applicants: BOGE ELASTMETALL GMBH, Damme (DE); VOLKSWAGEN AKTIENGESELLSCHAFT, Wolfsburg (DE)

(72) Inventors: Joerg Scharf, Eppenrod (DE); Jens Pape, Gifhorn (DE)

(73) Assignees: BOGE ELASTMETALL GMBH, Damme (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 142 days.

(21) Appl. No.: 15/030,519

(22) PCT Filed: Oct. 22, 2014

(86) PCT No.: PCT/EP2014/072692
§ 371 (c)(1),
(2) Date: Apr. 19, 2016

(87) PCT Pub. No.: WO2015/059214
PCT Pub. Date: Apr. 30, 2015

(65) Prior Publication Data
US 2016/0252149 A1    Sep. 1, 2016

(30) Foreign Application Priority Data

Oct. 23, 2013    (DE) .................. 10 2013 221 503

(51) Int. Cl.
*F16F 1/44* (2006.01)
*F16F 13/10* (2006.01)
(Continued)

(52) U.S. Cl.
CPC .............. *F16F 1/445* (2013.01); *F16F 13/10* (2013.01); *F16F 15/022* (2013.01); *F16F 15/08* (2013.01);
(Continued)

(58) Field of Classification Search
CPC .......... F16F 1/445; F16F 15/022; F16F 15/08; F16F 2230/10; F16F 2230/06;
(Continued)

(56) References Cited

U.S. PATENT DOCUMENTS

| 4,905,956 A |   | 3/1990 | Zemlicka et al. |
|---|---|---|---|
| 5,060,917 A | * | 10/1991 | DuBos ................... F16F 13/06 267/140.13 |

(Continued)

FOREIGN PATENT DOCUMENTS

| CN | 102588502 A | 7/2012 |
|---|---|---|
| CN | 102734375 A | 10/2012 |

(Continued)

OTHER PUBLICATIONS

International Search Report for counterpart PCT International Application No. PCT/EP2014/072692, dated Mar. 20, 2015 (2 pages).

*Primary Examiner* — Xuan Lan Nguyen
(74) *Attorney, Agent, or Firm* — Cohen & Hildebrand, PLLC

(57) ABSTRACT

An axially damping elastomer bearing suitable for a motor vehicle, with a crucible-formed receptacle (13) for surrounding receiving an elastomeric support spring (15). The crucible-formed receptacle (13) is manufactured through casting and can be demolded in a demolding direction (39) and has a peripheral wall (19) with at least one drainage opening (Continued)

(33), wherein the at least one drainage opening (33) has a clearance (43, 45, 65) extending in the demolding direction (39).

17 Claims, 5 Drawing Sheets

(51) Int. Cl.
*F16F 15/02* (2006.01)
*F16F 15/08* (2006.01)

(52) U.S. Cl.
CPC . *F16F 2224/025* (2013.01); *F16F 2224/0208* (2013.01); *F16F 2226/00* (2013.01); *F16F 2226/047* (2013.01); *F16F 2230/06* (2013.01); *F16F 2230/10* (2013.01)

(58) Field of Classification Search
CPC ............ F16F 224/025; F16F 224/0208; F16F 1116/047; F16F 1116/00; F16F 13/10
See application file for complete search history.

(56) References Cited

U.S. PATENT DOCUMENTS

| | | | | |
|---|---|---|---|---|
| 6,517,061 | B2* | 2/2003 | Yamamoto | F16F 13/101 |
| | | | | 267/140.11 |
| 6,585,242 | B2* | 7/2003 | Kodama | F16F 13/26 |
| | | | | 267/140.13 |
| 6,808,167 | B2* | 10/2004 | Kodama | F16F 13/101 |
| | | | | 267/140.13 |
| 7,007,934 | B2* | 3/2006 | Goto | F16F 13/108 |
| | | | | 267/140.13 |
| 2013/0153741 | A1* | 6/2013 | Pichel | F16F 1/3849 |
| | | | | 248/634 |

FOREIGN PATENT DOCUMENTS

| | | |
|---|---|---|
| DE | 60111208 T2 | 1/2003 |
| DE | 102007003207 A1 | 8/2007 |
| DE | 102009037871 A1 | 2/2011 |
| DE | 102012201581 A1 | 8/2013 |
| EP | 1 270 993 A2 | 1/2003 |
| EP | 1277986 A2 | 1/2003 |
| EP | 2 436 948 A2 | 4/2012 |
| WO | 89 11416 A1 | 11/1989 |

* cited by examiner

AXIALLY DAMPING ELASTOMER BEARING, IN PARTICULAR FOR A MOTOR VEHICLE

This is an application filed under 35 USC § 371 of PCT/EP2014/072692, filed on Oct. 22, 2014, claiming priority to DE 10 2013 221 503.7, filed on Oct. 23, 2013, each of which is herein incorporated by reference in their entirety.

BACKGROUND OF THE INVENTION

The invention relates to an axially damping elastomer bearing, in particular for a motor vehicle, according to the preamble of claim 1.

Axially damping elastomer bearings for motor vehicles are known in many different forms. The key components of an axially damping elastomer bearing are an elastomeric support spring and a housing part which surroundingly accommodates this. In an installed state in which it is built into the motor vehicle, water-collecting geometrical regions are frequently formed between the elastomeric support spring and the housing part. Water-collecting geometrical regions should be understood here to mean cavities or contours in which liquids, in particular water, can collect when the motor vehicle is essentially standing vertically. Spray water frequently collects in these water-collecting geometrical regions, for example if the axially damping elastomer bearing is in the form of an engine bearing mounted in a relatively low position in relation to the roadway. Water from flooded roads or puddles can also collect in the water-collecting geometrical regions when driving. In addition, during a car wash, water can also collect in water-collecting geometrical regions of axially damping elastomer bearings which are mounted in more elevated installation locations within the motor vehicle. This applies for example to suspension strut support mounts.

If water which has collected in the water-collecting geometrical regions freezes, this frequently leads to a significant impairment of the damping and acoustic behaviour of the axially damping elastomer bearing. In addition, the elastomer bearing can also be damaged through freezing water, for example through bursting of the housing part holding the elastomeric support springs.

It is known, from the prior art for housing parts of axially damping elastomer bearings to be provided with drainage openings at the lowest points of the water-collecting geometrical regions in order to allow the water-collecting geometrical regions to be drained. Such a drainage outlet is for example known from DE 601 11 208 T2.

For cost reasons, the drainage openings are usually introduced into the housing parts by means of equipment which is used to manufacture the housing parts themselves. This can for example be a die-casting tool, if the housing part is designed as a die-cast part. It is known from the prior art for drainage openings to be formed in housing parts which are designed as die-cast parts by means of so-called sliders. The sliders thereby have an operating direction which is oriented roughly at right angles to a demoulding direction of the die-casting tool.

The object of the invention is, through a simplified manufacturing method, to provide an economical axially damping elastomer bearing with at least one drainage opening.

BRIEF SUMMARY OF THE INVENTION

According to the present invention this problem is solved through an axially damping elastomer bearing of the generic type which, in addition, has the characterising features of claim 1 of the patent.

Preferred embodiments and further developments are the subject matter of the dependent claims.

Accordingly, the invention provides for an axially damping elastomer bearing, in particular an axially damping elastomer bearing for a motor vehicle, with a crucible-formed receptacle for surroundingly accommodating an elastomeric support spring. The crucible-formed receptacle is manufactured through casting and can be demoulded in a demoulding direction. It has a peripheral wall with at least one drainage opening. The invention proposes that the at least one drainage opening has a clearance extending in the demoulding direction.

The axially damping elastomer bearing can be designed, among other things, as an assembly bearing, in particular an engine mount or transmission bearing, or as a suspension strut support mount. A crucible-formed receptacle is to be understood in connection with the present invention as a component which contains at least one crucible-formed receptacle. The component can in addition possess further geometrical regions such as connection geometries for attachment to neighbouring components, for example in the form of feet which are also produced through casting. The component contained in the crucible-formed receptacle can, in addition or alternatively, contain further receptacles for further components.

Casting is to be understood in connection with the present invention to refer to a manufacturing method in which a solid body in the form of a cast part is manufactured from a melt or plasticised material. For this purpose, the melt or plasticised material is poured into a mould in a molten or plasticised state and demoulded after solidifying or hardening. Demoulding refers to a detachment of the solidified or hardened material from the mould. In order for this to succeed, the mould must be released through so-called draft angles. This means that the cross section of a mould must be larger on the side on which the cast part is to be released from the mould than on the opposite side. This procedure is also referred to in the field of mould construction as clearance.

The at least one drainage opening is arranged, in relation to an installation location within the motor vehicle, as known from the prior art, at the lowest point of a water-collecting geometrical region formed between the crucible formed receptacle and the elastomeric support spring. The water-collecting geometrical region, again considered in its installation location within the motor vehicle, is arranged above the elastomeric support spring. The water-collecting geometrical region can for example be a channel arranged between the crucible-formed receptacle and the elastomeric support spring which surrounds the elastomeric support spring in the installed state at substantially the same height level. Demouldability in the demoulding direction is to be understood in connection with the present invention to mean a demouldability both in a positive and also in a negative demoulding direction. As a rule, during demoulding one tool part remains fixed in position while the other moves relative to this. However, other configurations with respect to demoulding in the demoulding direction are conceivable, for example the movement of several tool parts in a positive and/or negative demoulding direction.

A parallel projection in the demoulding direction onto the elastomer bearing along the clearance opens a view onto the projected surface of a wall, frequently referred to as a reveal, of the drainage opening.

Clearance extending in the demoulding direction is to be understood in relation to the present invention as meaning a contour region of the cast part which is cleared in order to ensure demouldability.

For example, a demouldable inner contour or a part of the demouldable inner contour of the crucible-formed receptacle can be formed in the shape of the surface of a truncated cone. An outer contour of the crucible-formed receptacle can be formed as a cylindrical surface. The inner contour and the outer contour have a common central axis which also extends in the demoulding direction. In order to create a drainage opening, the outer contour can be provided with a flat section arranged parallel to the central axis such that in its axial extension the flat section penetrates through the inner contour. The drainage opening is formed in the region in which the flat section penetrates through the inner contour of the crucible-formed receptacle.

The design of the drainage opening with a clearance extending in the demoulding direction allows the drainage opening to be produced together with the crucible-formed receptacle through a casting process and demoulded in complete form in the demoulding direction. Such a process is also referred to as a top-down process. Relatively expensive sliders with an operating direction substantially perpendicular to the demoulding direction are not necessary in order to create the drainage opening. Dispensing with the use of sliders, which take up a relatively large construction space due to the working stroke which needs to be performed during the manufacturing process, means that the tools required for the casting process can be relatively compact in design. This makes it possible to provide a significantly greater number of mould cavities per production unit and thus produce a greater number of crucible-formed receptacles per working cycle, also referred to as a shot. In this way, the pro rata investment costs per crucible-formed receptacle can be reduced. In addition, dispensing with sliders means that the pro rata manufacturing costs can be reduced because as a result of the top-down process the time taken up for movements of the sliders is saved. In this way, the time taken to manufacture the crucible-formed receptacles per working operation, also referred to as the process or cycle time, is reduced.

Preferably, the clearance is formed through a first and a second slot, whereby the first and the second slot are formed in different peripheral surfaces of the peripheral wall and form a shared overlapping region. The first and the second slot in each case extend in the demoulding direction. If, apart from slight draft angles necessary for manufacturing reasons, the peripheral wall is substantially hollow-cylindrical in form, it is possible in each case to create the first and the second slot with a depth which is greater than or equal to half the wall thickness of the peripheral wall. In order for the drainage opening to be created in the shared overlapping region, the total of the two slot depths must correspond at least to the wall thickness of the peripheral wall in the region of the drainage opening.

The formation of the first and the second slot with a depth which substantially corresponds in each case to half the wall thickness has technical advantages in terms of casting. During the manufacture of the crucible-formed receptacle, the molten material can be well distributed within the cavity of the casting mould.

Advantageously, the first slot is formed in an outer peripheral surface of the peripheral wall in the region of the end facing a base of the crucible-formed receptacle and the second slot is formed in an inner peripheral surface of the peripheral wall in the region of the end facing away from the base of the crucible-formed receptacle.

Coming from opposite directions, the first and the second slot each extend as far as the overlapping region, where they jointly form the drainage opening. This design makes possible a robust, fracture-proof tool design, because in order to form the first and the second slot mould sections are in each case attached to immediately adjacent solid mould sections or are formed integrally with these.

According to a further development of the invention, the inner peripheral surface of the peripheral wall in the region of the end facing the base of the crucible-formed receptacle has a continuous curve.

Here, a continuous curve is understood to mean a so-called constant-tangent curve, also referred to as a constant-curvature curve, as known for example from bodywork styling. The continuous curve can relate to the peripheral direction and/or to the demoulding direction. In this way a receptacle is provided for the elastomeric support spring in the region of the end facing the base of the crucible-formed receptacle which fully encloses it and which makes possible an even transmission of damping forces via the elastomeric support spring into the crucible-formed receptacle. This is particularly advantageous if a plastic ring adhesively bonded with the elastomeric support spring is arranged between the elastomeric support spring and the crucible-formed receptacle. This ring made of plastic, which alternatively can also be made of metal, in particular of steel, preferably follows a continuous curve, like the peripheral region of the elastomeric support spring which this encloses.

Advantageously, the outer peripheral surface of the peripheral wall follows a continuous curve in the region of the end facing away from the base of the crucible-formed receptacle. In this case the continuous curve primarily relates to the peripheral direction, but alternatively or additionally can also relate to the demoulding direction. As a result of a continuous curvature of the outer peripheral surface of the peripheral wall, which at the same time also forms an outer contour of the finished elastomer bearing, injuries during the course of assembly work carried out the motor vehicle can be prevented.

Preferably, the inner peripheral surface of the peripheral wall has a peripheral shoulder for receiving a cover part in the region of the end facing away from the base of the crucible-formed receptacle. The peripheral shoulder is open in the direction of the end facing away from the base of the crucible-formed receptacle, is in particular demouldable, and is advantageously circular in form. The shoulder, which represents a defined flat surface for receiving the cover part or the edge of the cover part, can be produced through casting or through milling. The peripheral wall has a reduced wall thickness in the region of the shoulder. The cover part is preferably designed in the form of a rotationally symmetrical sheet metal part the peripheral region of which is designed to lie on the shoulder. The cover part can, alternatively, also be designed as an injection-moulded plastic part.

It is favourable if the depth of the shoulder substantially corresponds to the depth of the second slot. This design offers advantages in manufacture through casting, because different wall thicknesses in the transitional region between the shoulder and the second slot and a possibly resulting unfavourable solidification behaviour following casting can be avoided.

It is practical for the drainage opening to be substantially rectangular in cross section, in particular square, with rounded corners. In order to minimise as far as possible the costs of manufacture and adjustment in the manufacture of the tool, the drainage opening should ideally be square in cross-section. Moreover, a drainage opening with square cross section has a larger cross-sectional surface area than a circle inscribed within it with a radius which corresponds to half the length of a side of the square. Should the cross section turn out to be rectangular, as a result of deviations in manufacture, this does not affect the function of the drainage opening. In order to avoid stress peaks at the corners of the rectangular or square cross sections due to a notch effect, these corners are rounded.

According to an alternative embodiment, the clearance is formed as a slot extending from the base and running through the peripheral wall. This makes it possible for water-collecting geometrical regions of the elastomer bearing which are located within the crucible-formed receptacle and, again considered in the installation location within the motor vehicle, above and below the elastomeric support spring, to be drained via a single slot. This design is particularly suitable if the elastomeric support spring is surrounded, in the region of the slot, by a ring made of metal, in particular of steel, because this prevents an undesirable penetration of parts of the elastomeric support spring into the slot when the elastomer bearing is under load.

Advantageously, at least the crucible-formed receptacle is made of aluminium, in particular die-cast aluminium. In this way, a stable and yet relatively light elastomer bearing can be provided. In this way, a stable and yet relatively light elastomer bearing can be provided.

According to a further development, the crucible-formed receptacle and the cover part are joined through roll beading. For this purpose the peripheral wall has a reduced wall thickness in the region of the shoulder, whereby when the cover part is fitted the reduced wall thickness projects beyond this in the demoulding direction and thus forms a beading. When the cover part is fitted in, place, in order to join said cover part to the crucible-formed receptacle through rolling, or roll beading, the beading is deformed in the direction of the central axis. In this way, a stable connection is formed between the crucible-formed receptacle and the cover part. This is particularly important if the cover part represents a limit stop for movements of the elastomeric support spring. The beading provides a rounding of the outer contour of the finished elastomer bearing in this region which provides protection against injuries during assembly work on the motor vehicle.

According to an alternative embodiment of the invention, at least the crucible-formed receptacle is formed of injection-moulded plastic, in particular of fibre-reinforced injection-moulded plastic. Manufacturing the crucible-formed receptacle of injection-moulded plastic has the advantage that the damping properties of the elastomer bearing are improved, because the injection-moulded plastic contributes to the damping effect. Regions of the crucible-formed receptacle made of injection-moulded plastic which are subjected to particularly high loads can be reinforced through insert parts which are enclosed during manufacture through casting, in this case through plastic injection moulding. The use of injection-moulded plastic for components of the elastomer bearings can reduce its weight or mass.

Preferably, the elastomer bearing is designed as a so-called dry elastomer bearing without damping fluid.

Where the elastomer bearing is designed as a so-called dry elastomer bearing the base of the crucible formed receptacle manufactured through casting can, during the course of manufacture, at the same time be provided with functional openings in a single working cycle. The functional openings, which for example serve the purpose of indirect attachment of the elastomeric support spring to the base, thereby extend in the demoulding direction.

According to an alternative embodiment, the elastomer bearing is designed as a hydro bearing with a damping fluid.

Where the elastomer bearing is designed as a hydro bearing with a damping fluid, the component containing the crucible-formed receptacle can have a further component for surroundingly receiving a channel disc. The further receptacle is thereby manufactured through casting in a single working cycle together with the crucible-formed receptacle. The crucible-formed receptacle and the further receptacle have the same demoulding direction.

BRIEF DESCRIPTION OF THE DRAWINGS

The invention is explained in more detail in the following with reference to drawings illustrating purely exemplary embodiments, in which.

DETAILED DESCRIPTION OF THE INVENTION

Figure 1:
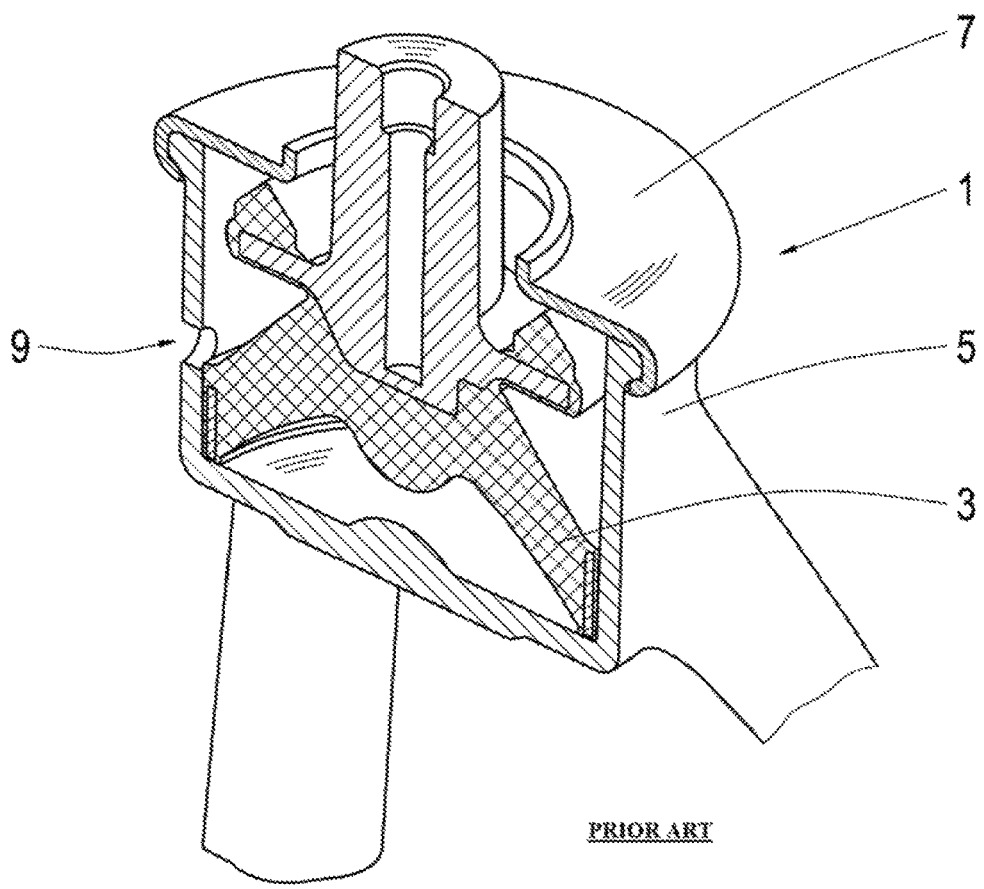
FIG. 1 shows a perspective sectional view of an elastomer bearing according to the prior art in assembled condition.

FIG. 1 shows an axially damping elastomer bearing 1 as known from the prior art. The elastomer bearing 1 comprises, inter alia, an elastomeric support spring 3 which is surrounded by a crucible-formed receptacle 5. The crucible-formed receptacle 5 with the elastomeric support spring 3 accommodated therein is sealed by a cover part 7. The cover part 7 is rotationally symmetrical in form and consists of sheet steel. It is joined to the crucible-formed receptacle 5 by means of roll beading, whereby a projecting peripheral edge of the cover part wraps around a peripheral, outwards-pointing bead on the crucible-formed receptacle 5. A cavity, which is substantially enclosed by the elastomeric support spring 3, the crucible-formed receptacle 5 and the cover part 7, is drained via a drainage opening 9 in a wall of the crucible-formed receptacle 5. The drainage opening 9 is cylindrical in form and extends substantially perpendicular to the wall. The crucible-formed receptacle 5 is manufactured together with the feet integrally attached thereto by means of a die-casting process. The drainage opening 9 is introduced into the wall of the crucible-formed receptacle by means of a slider.

Figure 2:
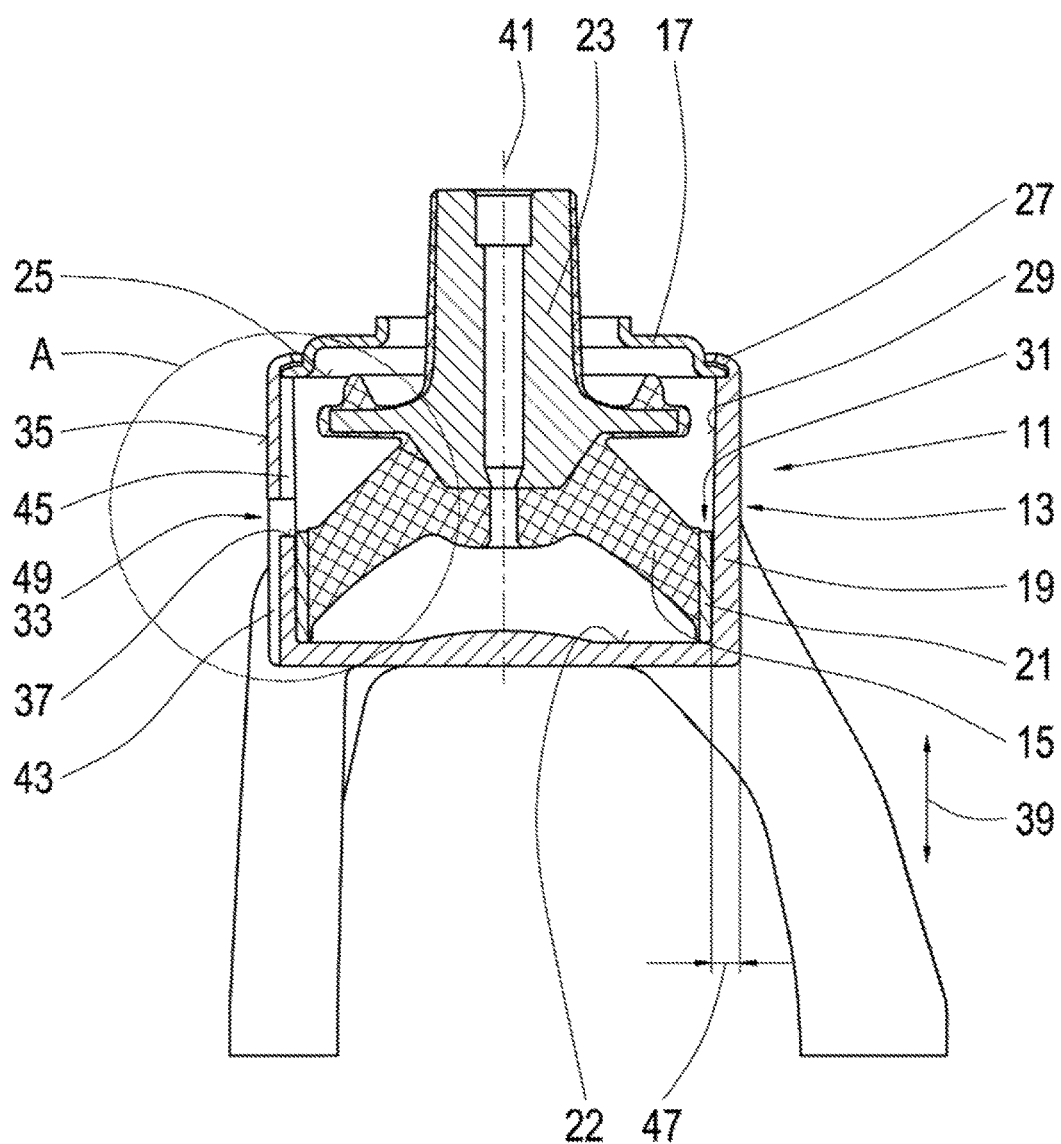
FIG. 2 shows a half-sectional representation of an elastomer bearing according to the invention.

FIG. 2 illustrates an axially damping elastomer bearing 11 according to the invention which is designed as a so-called dry elastomer bearing without damping fluid. The key components of the elastomer bearing are a crucible-formed receptacle 13, an elastomeric support spring 15 arranged therein and a cover part 17 sealing the crucible-formed receptacle 13. Arranged between the elastomeric support spring 15 and a peripheral wall 19 of the crucible-formed receptacle 13 is a ring 21 made of plastic which is bonded adhesively with the elastomeric support spring 15 and at the same time rests on a base 22 of the crucible-formed receptacle. A core section 23 is also bonded adhesively with the elastomeric support spring 15 in order to attach the elastomer bearing 11 to an assembly which is to be damped.

The edge of the cover part 17 rests on a peripheral shoulder 25 of the crucible-formed receptacle 13 and is fixed in place there through a beading 27 which is folded over by means of roll beading.

Due to the construction design, a peripheral water-collecting geometrical region 31 is formed between an inner peripheral surface 29 of the peripheral wall 19 and the elastomeric support spring 15. The water-collecting geometrical region 31 is drained via a drainage opening 33 which, on viewing an outer peripheral surface 35 of the peripheral wall 19, has a square cross section with rounded corners. A side of the wall 37 of the drainage opening 33 facing the base 22 of the crucible-formed receptacle 13 lies substantially at the same height as the end face of the plastic ring 21 facing away from the base 22. In this way, a complete drainage of the water-collecting geometrical region 31 is guaranteed.

In the present exemplary embodiment, the crucible-formed receptacle 1 is manufactured together with feet attached integrally thereto by means of casting in an aluminium die-casting process. Alternatively, casting by means of a plastic injection moulding process is possible. A demoulding direction 39 necessary for the casting runs parallel to a central axis 41 of the elastomer bearing 11, which in this exemplary embodiment is identical with the central axis 41 of the crucible-formed receptacle 13.

A first slot-formed clearance 43 is formed in the outer peripheral surface 35 of the peripheral wall 19 which extends from a base-side end of the crucible-formed receptacle 13 in the demoulding direction 39 as far as the drainage opening 33. The inner peripheral surface 29 of the peripheral wall 19 is uninterrupted in a peripheral direction from its base-side end up to the height of the drainage opening 33 in order to provide a full-surface contact surface for the plastic ring 21. A second slot-formed clearance 45 is formed in the inner peripheral surface 29 of the peripheral wall 19 which extends from the end facing away from the base 22 of the crucible-formed receptacle 13 in the demoulding direction 39 as far as the drainage opening 33. The depths of the first slot-formed clearance 43 and the second slot-formed clearance 45 in a direction perpendicular to the demoulding direction 39 are substantially identical and in total correspond to a wall thickness 47 of the peripheral wall 19. The first slot-formed clearance 43 and the second slot-formed clearance 45 have a shared overlapping region 49 which at the same, time forms the drainage opening 33.

Figure 3:
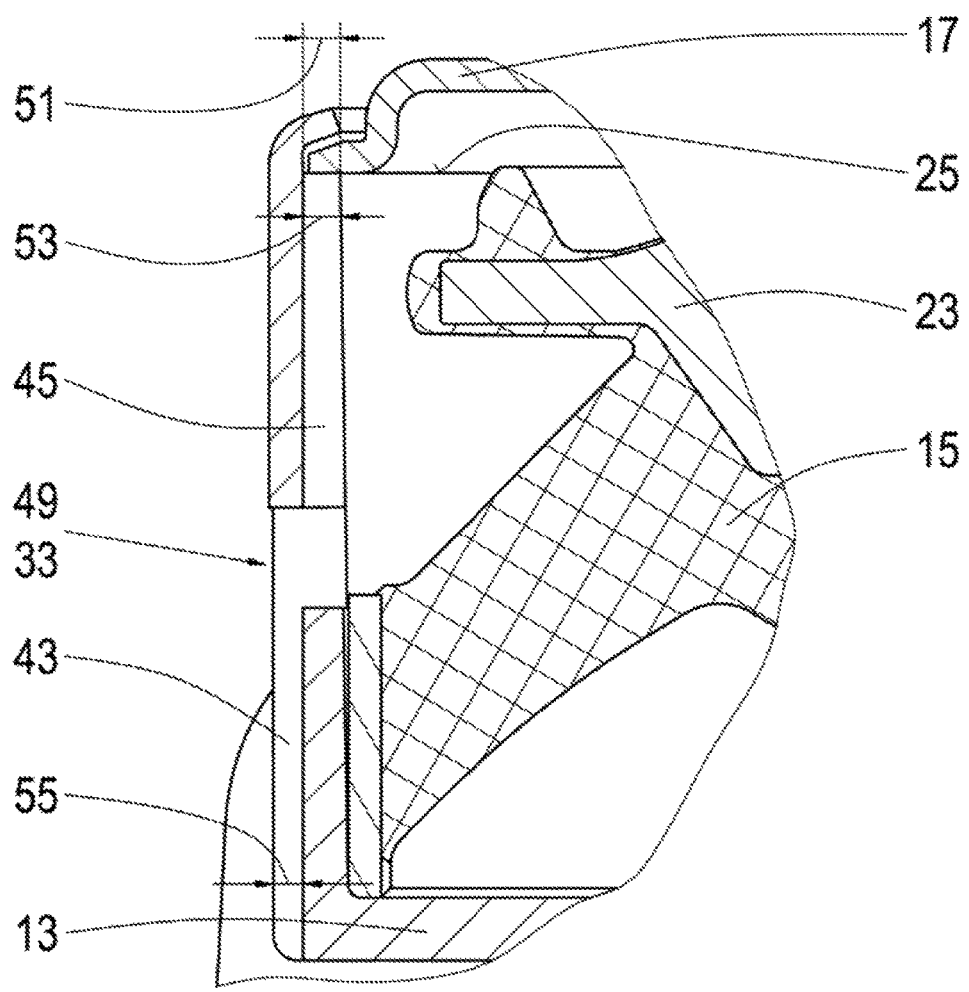
FIG. 3 shows an enlarged view of detail A in FIG. 2.

The cover part 17, the core section 23, the elastomeric support spring 15 and the crucible-formed receptacle 13 are indicated in FIG. 3. It can also be seen that a depth 51 of the peripheral shoulder 25 corresponds to a depth 53 of the second slot-formed clearance 45. The depth 53 of the second slot-formed clearance 45 corresponds to a depth 55 of the first slot-formed clearance 43. The first slot-formed clearance 43 and the second slot-formed clearance 45 overlap in the shared overlapping region 49 and there form the drainage opening 33.

Figure 4:
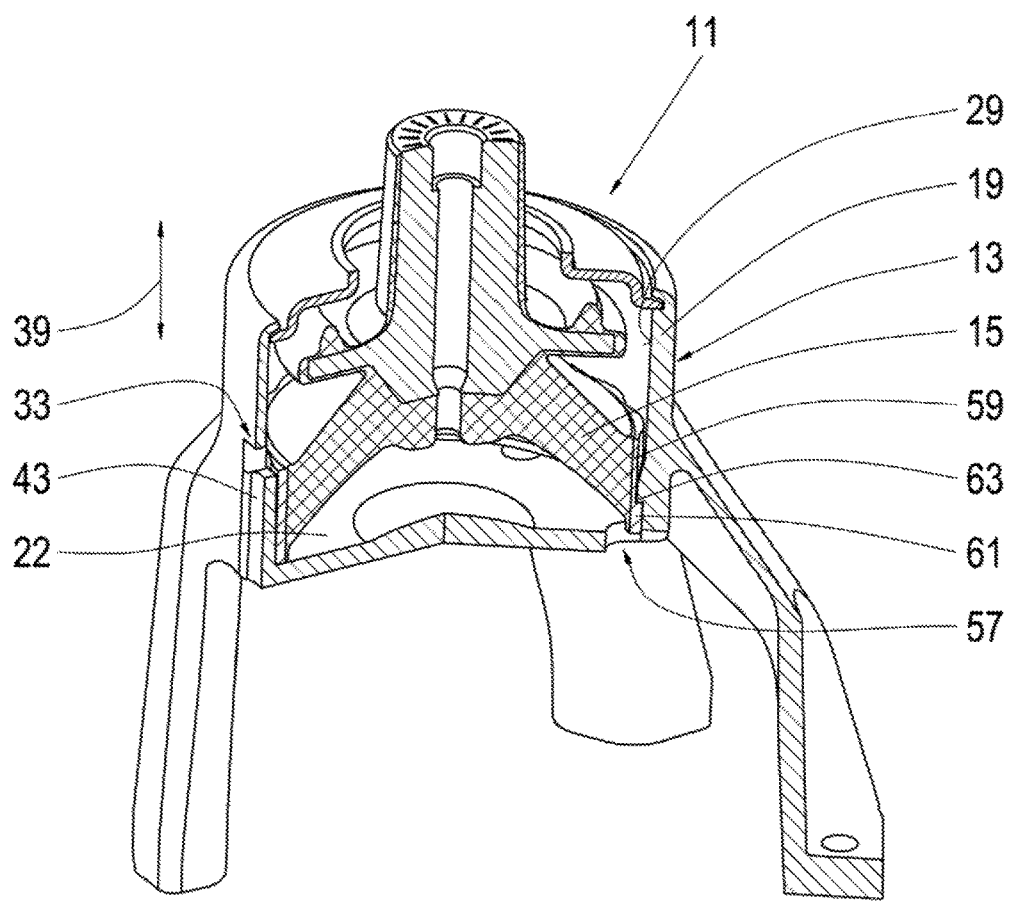
FIG. 4 shows a perspective sectional view of a second embodiment of the elastomer bearing according to the invention and FIG. 5 shows a half-sectional representation of a third embodiment of an elastomer bearing according to the invention.

FIG. 4 shows an alternative fastening concept for the elastomeric support spring 15. For this purpose, the base 22 of the crucible-formed receptacle 13 is provided with a functional opening 57 which extends in the demoulding direction 39 and can therefore be manufactured through casting in a single working cycle together with the crucible-formed receptacle 13. The elastomeric support spring 15 is surrounded by a plastic ring 59 in the region of the inner peripheral surface 29 of the peripheral wall 19 facing the base 22. The plastic ring 59 has on its end facing the base 22 at least one, but preferably a plurality of snap-locking latches 61. The snap-locking latch 61 extends into the functional opening 57 and, together with a corresponding projection 63 on the end of the inner peripheral surface 29 facing the base 22, forms a snap-locking connection. In this way, the elastomeric support spring 15 is attached indirectly to the base 22 of the crucible-formed receptacle 13 via the plastic ring 59 which is adhesively bonded to it. The elastomer bearing 11 is again a so-called dry elastomer bearing without damping fluid.

The drainage opening 33 with the first slot-formed clearance 43 already represented in FIG. 2 and FIG. 3 is represented in FIG. 4 in a perspective sectional view.

Figure 5:
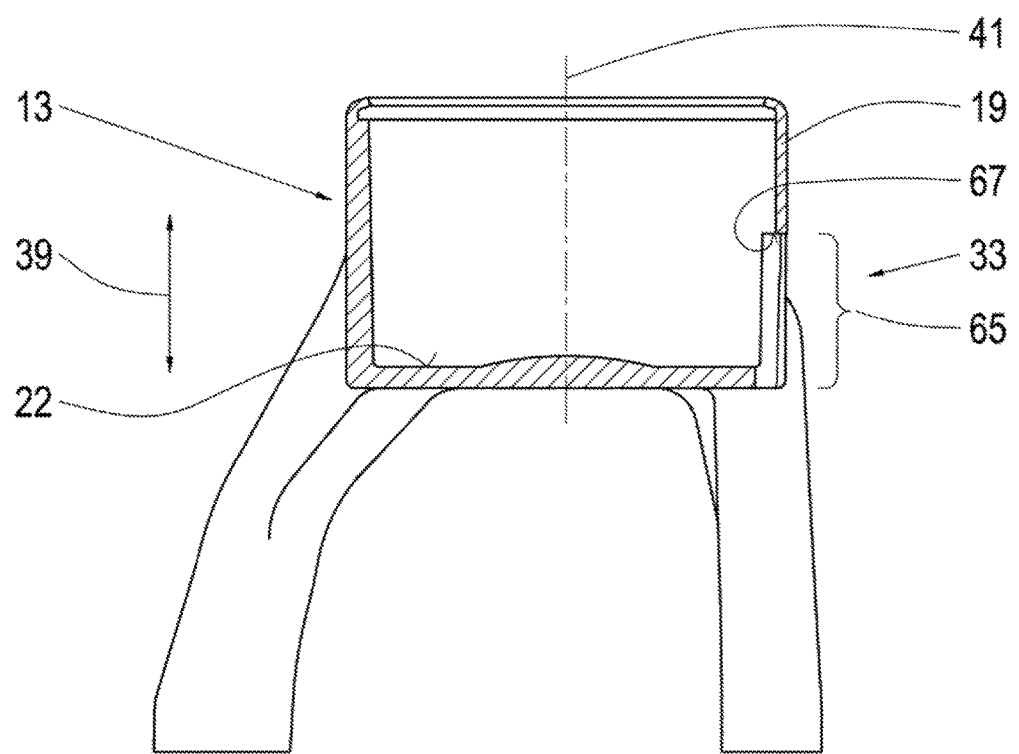

FIG. 5 shows the slot-formed clearance 65 which runs through the base 22 and a part of the peripheral wall 19 of the crucible-formed receptacle 13 and in this way provides an alternative design of the drainage opening 33. The slot-formed clearance 65 again extends in the demoulding direction 39 and can therefore also be manufactured through casting together with the crucible-formed receptacle 13 in a single working cycle. In this embodiment, a ring, not shown here, which surrounds the elastomeric support spring, which is also not shown here, is preferably made of steel in order to be able to bridge the slot-formed clearance 65 without unacceptable deformation. This would not necessarily be guaranteed in the case of an alternative ring made of plastic. The slot-formed clearance 65 extends in the direction of the end of the crucible-formed receptacle 13 facing away from the base 22, with a wall section 67, to a point above the steel ring, which is not shown. It is thus guaranteed that water which has collected above the elastomeric support spring 15, which is not shown, can be drained away, reliably. Depending on how far the slot-formed clearance 65 extends in the direction of the central axis 41, it can also be possible to drain the region between the elastomeric support spring 15 and the base 22 with the drainage opening 33.

REFERENCE NUMBERS 1 elastomer bearing according to the state of the art
3 crucible-formed receptacle according to the state of the art
5 crucible-formed receptacle according to the state of the art
7 cover part according to the state of the art
9 drainage opening according to the state of the art
11 elastomer bearing
13 crucible-formed receptacle
15 elastomeric support spring
17 cover part
19 peripheral wall of the crucible-formed receptacle
21 ring made of plastic
22 base of the crucible-formed receptacle
23 core section
25 peripheral shoulder
27 beading
29 inner peripheral surface of the peripheral wall
31 water-collecting geometrical region
33 drainage opening
35 outer peripheral surface of the peripheral wall
37 wall of the drainage opening
39 demoulding direction
41 central axis
43 first slot-formed clearance
45 second slot-formed clearance
47 wall thickness of the peripheral wall
49 shared overlapping region
51 depth of the peripheral shoulder 53 depth of the second slot-formed clearance
55 depth of the first slot-formed clearance
57 functional opening
59 plastic ring
61 snap-locking latches
63 projection
65 slot-formed clearance
67 wall section

The invention claimed is:

1. An axially damping elastomer bearing (11) with a crucible-formed receptacle (13) for surroundingly receiving an elastomeric support spring (15), wherein the crucible-formed receptacle (13) is manufactured through casting and is demoldable in a demoulding direction (39) and has a peripheral wall (19) with at least one drainage opening (33), wherein the at least one drainage opening (33) has a clearance (43, 45, 65) extending in the demoulding direction (39), wherein the clearance is formed by a first (43) and a second slot (45), and wherein the first (43) and the second slot (45) are formed in different peripheral surfaces (29, 35) of the peripheral wall (19) and form a shared overlapping region (49).

2. The axially damping elastomer bearing (11) according to claim 1, wherein the first slot (43) is formed in an outer peripheral surface (35) of the peripheral wall (19) in a region of an end facing a base (22) of the crucible-formed receptacle (13) and the second slot (45) is formed in an inner peripheral surface (29) of the peripheral wall (19) in the region of the end facing away from the base (22) of the crucible-formed receptacle (13).

3. The axially damping elastomer bearing (11) according to claim 1, wherein an inner peripheral surface (29) of the peripheral wall (19) follows a continuous curve in a region of an end facing the base (22) of the crucible-formed receptacle (13).

4. The axially damping elastomer bearing (11) according to claim 1, wherein an outer peripheral surface (35) of the peripheral wall (19) follows a continuous curve in a region of an end facing away from the base (22) of the crucible-formed receptacle (13).

5. The axially damping elastomer bearing (11) according to claim 2, wherein the inner peripheral surface (29) of the peripheral wall (19) has a peripheral shoulder (25) for receiving a cover part (17) in the region of the end facing away from the base (22) of the crucible-formed receptacle (13).

6. The axially damping elastomer bearing (11) according to claim 5, wherein a depth (51) of the peripheral shoulder (25) substantially corresponds to a depth (53) of the second slot (45).

7. The axially damping elastomer bearing (11) according to claim 1, wherein the drainage opening (33) is substantially rectangular in cross section.

8. An axially damping elastomer bearing (11) with a crucible-formed receptacle (13) for surroundingly receiving an elastomeric support spring (15), wherein the crucible-formed receptacle (13) is manufactured through casting and is demoldable in a demoulding direction (39) and has a peripheral wall (19) with at least one drainage opening (33), wherein the at least one drainage opening (33) has a clearance (43, 45, 65) extending in the demoulding direction (39), wherein the clearance is formed as a slot (65) extending from a base (22) and running through the peripheral wall (19).

9. The axially damping elastomer bearing (11) according to claim 1, wherein at least the crucible-formed receptacle (13) is made of aluminium.

10. The axially damping elastomer bearing (11) according to claim 9, wherein the crucible-formed receptacle (13) and a cover part (17) are joined by roll beading.

11. The axially damping elastomer bearing (11) according to claim 1, wherein at least the crucible-formed receptacle (13) is made of injection-moulded plastic.

12. The axially damping elastomer bearing (11) according to claim 1, wherein the elastomer bearing (11) is designed as a dry elastomer bearing without damping fluid.

13. The axially damping elastomer bearing (11) according to claim 1, wherein the elastomer bearing (11) is designed as a hydro bearing with a damping fluid.

14. The axially damping elastomer bearing according to claim 1, wherein the bearing is for a motor vehicle.

15. The axially damping elastomer bearing (11) according to claim 7, wherein the drainage opening (33) is substantially square with rounded corners.

16. The axially damping elastomer bearing (11) according to claim 9, wherein the aluminium is die-cast aluminium.

17. The axially damping elastomer bearing (11) according to claim 11, wherein the injection-moulded plastic is fibre-reinforced injection-moulded plastic.

* * * * *